United States Patent [19]

Marrington

[11] 4,291,820
[45] Sep. 29, 1981

[54] LIQUID METERING DISPENSER

[75] Inventor: Jack D. Marrington, Capalaba, Australia

[73] Assignee: J. D. Engineering Services Pty. Ltd., Australia

[21] Appl. No.: 3,894

[22] Filed: Jan. 16, 1979

Related U.S. Application Data

[63] Continuation-in-part of Ser. No. 685,922, May 12, 1976, Pat. No. 4,153,187.

[30] Foreign Application Priority Data

| May 16, 1975 [AU] | Australia | 1636/75 |
| Oct. 30, 1975 [AU] | Australia | 3780/75 |
| Feb. 13, 1976 [AU] | Australia | 4847/76 |

[51] Int. Cl.³ .................................. G01F 11/42
[52] U.S. Cl. ............................ 222/70; 222/159; 222/440; 222/444; 222/504
[58] Field of Search ........... 222/157, 158, 159, 325, 222/444, 504, 440, 70

[56] References Cited

U.S. PATENT DOCUMENTS

| 28,690 | 6/1860 | Rankin | 222/157 |
| 436,212 | 9/1890 | Chamberlin | 222/157 |
| 1,733,310 | 10/1929 | Manley | 222/440 |
| 1,831,028 | 11/1931 | Olson | 222/325 UX |
| 2,761,595 | 9/1956 | Vergers | 222/444 X |
| 2,838,208 | 6/1958 | Levit | 222/440 X |
| 2,961,880 | 11/1960 | Griswold | 222/444 X |
| 3,248,011 | 4/1966 | Brodsky et al. | 222/504 X |
| 3,930,598 | 1/1976 | Slagle | 222/325 X |

Primary Examiner—Robert J. Spar
Assistant Examiner—Frederick R. Handren

[57] ABSTRACT

A liquid dispenser includes a metering chamber with a piston assembly movable therein for variance of the chamber volume and a supply chamber capable of liquid communication with the metering chamber. A hollow valve body with valve seats communicating with the metering and supply chambers and with a dispensing outlet is positioned between such chambers. A valve member is located within the valve body and is actuable by a control mechanism such that it is given an operating cycle whereby during one operating cycle the valve member is actuated into a first position to close the valve seat communicating with the supply chamber and to permit communication between the metering chamber and dispensing outlet and is maintained in the first position for a period of time sufficient to permit the emptying of the metering chamber through the dispensing outlet. The valve member and control mechanism are also arranged so that upon emptying of the metering chamber during one operating cycle the valve member is actuated into a second position so as to close the dispensing outlet and permit communication between the supply and metering chambers for refilling of the metering chamber.

5 Claims, 4 Drawing Figures

LIQUID METERING DISPENSER

RELATED APPLICATION

This is a Continuation-in-Part of Patent Application Ser. No. 685,922, filed May 12, 1976, now U.S. Pat. No. 4,153,187 issued May 8, 1979 the subject matter of which is incorporated herein as of more fully set forth.

BACKGROUND OF THE INVENTION

This invention relates to a liquid dispenser and more particularly to a liquid dispenser of the type which is adapted to cooperate with an inverted open-topped container to dispense, upon actuation, a predetermined quantity of liquid.

There have been provided in the past many spirit dispensers for dispensing a predetermined quantity of spirit from a reservoir, for example, a bottle. The dispensers that have been available for dispensing from a supported inverted bottle or other remote source utilize valve means or spring diaphragms to regulate the quantity of fluid dispensed. Accordingly, many of the presently available types of dispensers, dispense amounts of spirit which may vary over a wide range.

It is the principal object of this invention to provide a liquid dispenser which will overcome the disadvantages of the presently available dispensers.

It is another object of the invention to provide a liquid dispenser which may be manually actuable so as to automatically dispense a predetermined quantity of liquid and which is tamperproof until such quantity of liquid is completely dispensed.

Another object of the invention is to provide a liquid dispenser in which the liquid is dispensed under the influence of gravity.

Yet another object of the invention is the provision of a liquid dispenser which is manually actuable and provided with an electrically controlled valve operable through a single dispenser and replenishing cycle so as to dispense a precisely metered quantity of liquid with each activation of the dispenser.

Other objects and advantages will become readily apparent from the ensuing description.

In accordance with the invention there is provided a liquid dispenser comprising a metering chamber and a piston assembly selectively movable therein to vary the volume of said chamber; a supply chamber adapted for liquid communication with said metering chamber; a hollow valve body intermediate said supply and metering chambers including a first valve seat communicating with said supply chamber, a second valve seat communicating with said metering chamber and a liquid dispensing outlet; a valve member positioned within said valve body and actuable exteriorly thereof; control means for actuating said valve member including a valve lever and timing means operatively connected to said valve lever for controlling the operating cycle of said valve member, whereby during one operating cycle said valve member is actuated initially by said valve lever into a first position so as to close said first valve seat and permit communication between said second valve seat and said dispensing outlet and is maintained in said first position for a period of time sufficient to permit the emptying of said metering chamber through said dispensing outlet, said valve lever thereupon actuating said valve member into a second position so as to close said dispensing outlet and permit communication between said supply and metering chambers via said first and second valve seats and is maintained in said second position for a period of time sufficient to refill said metering chamber from said supply chamber.

BRIEF DESCRIPTION OF THE DRAWINGS

In order that the invention may be more fully comprehended it will now be described by way of example, with reference to the accompanying drawings in which.

DETAILED DESCRIPTION OF THE INVENTION

Figure 1:
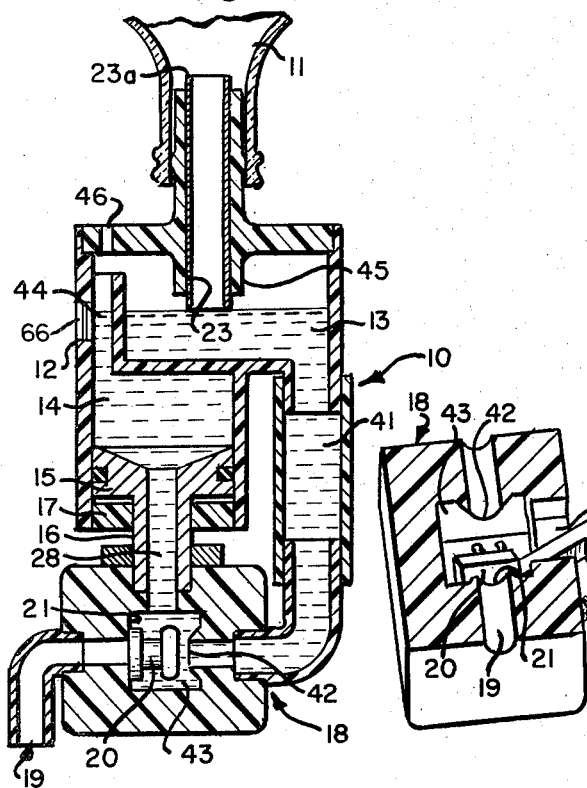
FIG. 1 is a side elevational cross-sectional view of a liquid dispenser embodying the features of the invention.

Referring to FIG. 1 there is shown a manually controlled dispenser 10 adapted for dispensing a selected quantity of a liquid such as alcohol spirit from an inverted bottle 11, only the lowermost portion of which is shown. The dispenser 10 comprises a body portion 12 molded of a synthetic plastics material. The front portion of the body may include a transparent section 66 capable of functioning as a sight glass in order to ascertain the liquid level prior to actuation of the dispenser. It will be appreciated that the body portion 12 may be molded in two sections which are cooperable with each other and with a rim or flange on the supply chamber so as to receive the supply chamber and associated structure there within in assembled relationship. The body of the dispenser thus houses a supply chamber 13 and a metering chamber 14. A reciprocable piston 15 is sealably slidable in the metering chamber 14 and is adjustably mounted so that the volume of the metering chamber 14 thereabove may be selectively varied. The piston is desirably supported by a hollow piston rod 16 which passes threadedly through a cap 17 which is secured within the open lower end of the metering chamber 14. The passage 28 through the hollow rod 16 communicates with the metering chamber 14. Thus, the piston rod 16 performs the dual functions of supporting the piston 15 at a selected position within the chamber and of providing a dispensing outlet for the metering chamber 14.

The metering chamber 14 is adapted to be replenished from the supply chamber 13 through a two-way valve means 18 provided to control the flow of fluid between the chambers 13 and 14, and through a drain outlet 19. Valve 18 is preferably a separate fitting and in the preferred form of the invention is electrically operated.

The valve 18 comprises a flap valve 20 which is biased for closure of the outlet passage 19 but which normally permits communication between the dispensing outlet 28 and a passage 41 that communicates with the metering chamber 14 and the supply chamber 13 respectively. As depicted in FIG. 1 passage 41, may take the form of a hollow sleeve member. When the flap valve member 20 is pivoted to close the passage 41 at the seat 42 the spirit in the metering chamber 14 will flow through the dispensing outlet 28, the interior 43 of the valve 18 to and through the outlet 19. After the metering chamber 14 has been emptied the valve member 20 is actuated to return to its normal position across the outlet valve seat 21, as illustrated in FIG. 1, so that the emptied metering chamber 14 will re-fill from the supply chamber 13 until the level of both chambers is the same. The chamber 14 is provided with an upper small diameter level passage 44 for achieving consistently accurate results. It will thus be understood that any variation in liquid level in the metering chamber will reflect itself in a corresponding variation in liquid level within the small diameter passage 44. There will, therefore, be only a small percentage variation in the volume of liquid contained within chamber 14. Furthermore, the liquid level is fixed at the lower end of the inlet stem 45 so that the only variable is the position of the piston 15. The level of the liquid in the supply chamber 13 may be maintained with the effective opening of the bottle 11 (i.e. the opening of passage 23) positioned at the desired liquid level. This may be varied by utilizing a form fit sleeve 23a within the passage as can be seen in FIG. 1.

Figure 2:
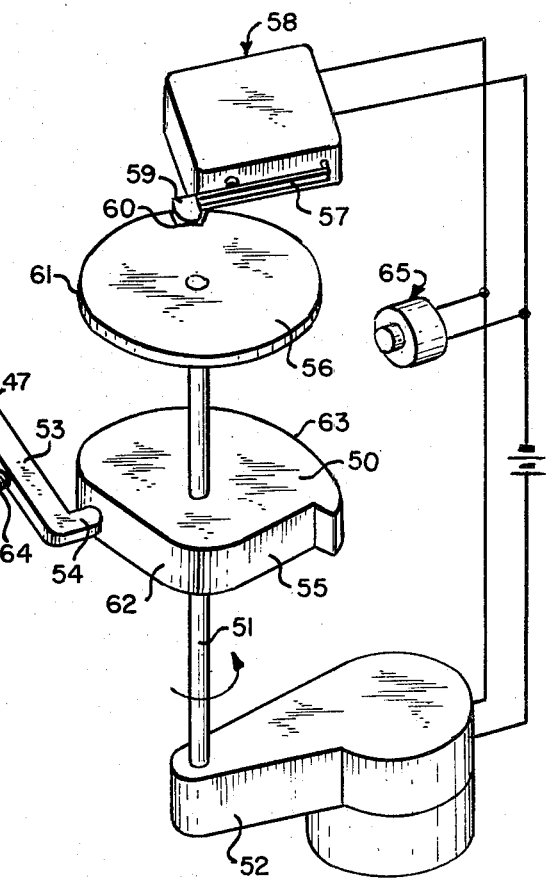
FIG. 2 is a perspective diagrammatic view of a valve and electric control arrangement for the dispenser shown in FIG. 1.

As shown in FIG. 2, the two-way flap valve 20 is arranged for actuation by a cam 50 connected to the output shaft 51 of a synchronous motor and gearbox assembly 52. The flap valve member 20 is connected operatively to a valve pivot lever 53 which is disposed with its cam-contacting abutment 54 in operative relationship relative to the cam face 55 of the cam 50. The flap valve member 20 is desirably contained sealably within a flexible shroud (not shown) which passes into the chamber 43 and which seals around an opening 47 through which the valve lever 53 passes. The output shaft 51 also supports a notched cam 56 which is cooperable with a switch lever 57 of a limit switch assembly 58 such when abutment 59 of the switch lever 57 is located within a notch 60 of the cam 56, the contacts of the switch are placed in open-circuit, but are closed when the cam 56 is rotated causing the abutment 59 to move outwards so as to bear against the outer periphery 61 of the cam 56.

When the abutment 54 of the valve lever 53 bears against the cut-away face 62 of the cam member 50, the flap valve member 20 is held sealably against the outlet seat 21 (which is shown diagrammatically in half-section in the drawings). As the cam 50 is rotated, the abutment 54 is caused to engage the part-circular portion 63 of the cam face 55, in which position the valve lever 53 is positioned to maintain the flap member 20 sealably against the seat 42. In this position, spirit may flow from the dispenser 10 through the outlet 19.

The valve lever 53 is provided with spring means 64 adapted to urge the flap into sealing engagement with the seat 21. There is also provided an actuating press button assembly 65 for actuation of the device, the electrical connection between the press button assembly, electric motor, power supply and micro-switch being shown.

In operation, when the button 65 is pressed, the motor and gearbox assembly is activated and the output shaft 51 rotates. Upon initial rotation the abutment 59 of the micro-switch is shifted out of the notch 60 into engagement with the outer periphery of the cam 56, whereupon the contacts of the micro-switch are maintained in closed condition so that the motor will continue to operate until the abutment 59 again is urged back into the notch 60 at the end of one revolution of the cam 56. Simultaneously, the valve lever 53 is pivoted from its normal inoperative position, as shown, to urge the flap member 20 sealably against the valve seat 42. In this position, spirits can flow through the outlet passage 19. The flap 20 is maintained in this position long enough to dispense the contents of the metering chamber by correct selection of the length of the arc of the part-circular cam surface 63. Prior to completion of the cycle, coinciding with one revolution of the output shaft 51 as set out above, the abutment 54 of lever 53 engages the cut-away portion 62 of the cam surface 55 to enable the spring 44 to urge the flap member 20 back into engagement with the outlet valve seat 21. It will thus be seen that the device is of simple construction and that actuation while manual, results in an automatically timed dispensing of the liquid within the metering chamber. Various other control arrangements could be used advantageously. Of course there is provided an air bleed 46 so that the liquid levels will be maintained at the same level.

Figure 3:
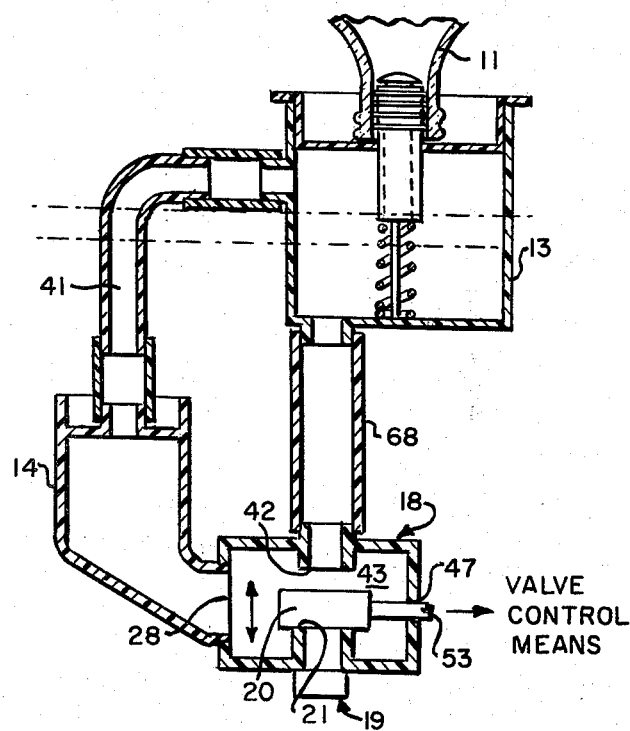
FIG. 3 is a side elevational view, partly in cross-section, of a liquid dispenser of modified construction.

Referring to FIG. 3 it will be observed that supply chamber 13 is positioned above the metering chamber 14, both of such chambers being normally in open communication by means of passage 41 which also serves as the sight gage or glass as stated earlier. A pair of reference marks 67 (see FIG. 4) are desirably provided in order to readily determine by visual inspection the level of liquid within the supply chamber to assure that upon activation of the device a full metered amount of the liquid will be dispensed. Passage 41 connects an intermediate section of supply chamber 13 with the upper region of metering chamber 14, and replenishment of the metering chamber is effectuated by means of a conduit 68 which extends between the bottom of the supply chamber and the housing of valve 18. It will also be observed that the flap valve 20 is arranged to pivot between valve seats 21 and 42, being normally biased to be positioned on valve seat 21 to prevent discharge of liquid from the dispensing outlet 19. The valve control mechanism of the dispenser of FIGS. 3 and 4 functions in substantially the same manner as described with reference to the embodiment of FIG. 1 except that when valve member 20 is in its normal position on seat 21 liquid flows from supply chamber 13 through conduit 68 and the housing for valve 18 into the metering chamber 14 and thereabove into passage 41 until it reaches a level between reference markings 67 as will be determined by the location of the effective opening of bottle 11 as previously described. When button 65 is pressed to activate the dispenser flap member 20 will be urged against valve seat 42 to prevent communication between the supply and metering chambers and simultaneously establish communication between the metering chamber and dispensing outlet 19 via the valve housing and outlet 28. Upon dispensing the metered quantity of liquid, e.g. spirit, cams 50 and 56 rotate as described above to return the flap valve to its normal position seated on valve seat 21 preventing further dispensing of liquid and permitting the replenishment of the metering chamber as described.

Figure 4:
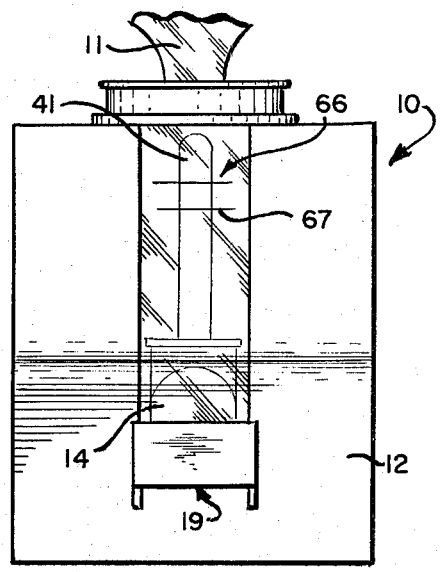
FIG. 4 is a front view of the dispenser shown in FIG. 3 with the housing positioned thereover.

The construction of FIGS. 3 and 4 will thus be seen as enabling cyclic operation control of the dispenser with readily visible means for ascertaining that there is an adequate supply of liquid to provide the predetermined metered quantity thereof. Also, provision of a dispenser body in two segments cooperable with the supply chamber as stated earlier facilitates assembly and disassembly of the dispenser in the event there is need for maintenance or replacement of any of the components of the device.

Furthermore, the dispenser could be produced to dispense one selected volume only, whence the inclusion of the piston 15, would not be essential. However, it may be then desirable to provide fine adjustment by adjustably mounting the inlet stem 45 for providing adjustment of the liquid level in the supply chamber 13.

Also, while in the preferred embodiment only one movable valve member provides a dual function, it is the ambit of the invention to utilize separate valves for controlling the flow of fluid of liquid between the supply chamber and the metering chamber and for controlling the flow of fluid from the metering chamber through the outlet. Further, other means which are commonly employed may be employed to maintain the level of liquid in the supply chamber at the preselected level, even if the liquid source is remote from the dispenser. Also the metering chamber and the supply chamber may, if desired, be supported remotely from one another.

While the above has been given by way of example illustrative of the broad concept of the invention, it will of course be realized that many other modifications of constructional detail and design may be made to the above described embodiment by persons skilled in the art without departing from the broad scope and ambit of the invention as is defined by the appended claims.

What is claimed:

1. A liquid dispenser comprising a metering chamber and a piston assembly selectively movable therein to vary the volume of said chamber, said piston assembly including a hollow piston rod providing a flow through passage communicating with said metering chamber, a supply chamber adapted for liquid communication with said metering chamber via said hollow piston rod, the upper regions of said supply and metering chambers being in air communication, a hollow valve body intermediate said supply and metering chambers including a first valve seat communicating with said supply chamber, a second valve seat communicating with said metering chamber and a liquid dispensing outlet; a valve member positioned within said valve body and actuable exteriorly thereof; control means for actuating said valve member including a valve lever and timing means operatively connected to said valve lever for controlling the operating cycle of said valve member, whereby during one operating cycle said valve member is actuated initially by said valve lever into a first position so as to close said first valve seat and permit communication between said second valve seat and said dispensing outlet and is maintained in said first position for a period of time sufficient to permit the emptying of said metering chamber through said dispensing outlet, said valve lever thereupon actuating said valve member into a second position so as to close said dispensing outlet and permit communication between said supply and metering chambers via said first and second valve seats and is maintained in said second position for a period of time sufficient to refill said metering chamber from said supply chamber.

2. A liquid dispenser according to claim 1, wherein said supply and metering chambers are positioned at a level above said valve body to thereby effectuate gravitational dispensing of liquid and gravitational replenishment of the metering chamber.

3. A liquid dispenser according to claim 1, wherein said timing means includes a first and second cam member, said first cam member being operatively connected to said valve lever, an electric motor drivably connected to said first cam member for rotation thereof, manually operable starting switch means for said motor connected in parallel circuit with an override on/off switch, said override switch being mechanically coupled to said second cam member for actuation thereby whereby, upon activation of said starting switch said override switch will be closed and will be maintained closed for the period of said operating cycle, the electric motor thereby being maintained in operation to drive said cam members through one complete operating cycle.

4. A liquid dispenser according to claim 3, wherein said overriding switch is a lever-operated limit switch and said second cam member has a notch formed in the peripheral camming surface thereof, said first cam member and said second cam member being carried by a common shaft drivable by said electric motor.

5. A liquid dispenser according to claim 4, wherein said second cam member comprises a substantially circular plate having said notch therein, said limit switch including a switch lever cooperable with said second cam member and notch therein such that movement of said switch lever into said notch results in open-circuiting of said limit switch, said notch being so positioned on said second cam member such that it will receive said switch lever at the end of one complete operating cycle, one complete revolution of said first cam member and said second cam member corresponding to one complete operating cycle.

* * * * *